United States Patent
Liesche et al.

(10) Patent No.: US 7,765,203 B2
(45) Date of Patent: Jul. 27, 2010

(54) IMPLICIT CONTEXT COLLECTION AND PROCESSING

(75) Inventors: Stefan Liesche, Boeblingen (DE); Andreas Naurez, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 11/853,319

(22) Filed: Sep. 11, 2007

(65) Prior Publication Data
US 2008/0065608 A1  Mar. 13, 2008

(30) Foreign Application Priority Data
Sep. 11, 2006  (EP) .................... 06120468

(51) Int. Cl.
G06F 7/00  (2006.01)
G06F 17/30  (2006.01)
(52) U.S. Cl. ............... 707/721; 707/731; 707/737; 707/739; 707/766
(58) Field of Classification Search ............. 707/3
See application file for complete search history.

(56) References Cited
U.S. PATENT DOCUMENTS 6,151,584 A * 11/2000 Papierniak et al. ........... 705/10
6,601,057 B1 * 7/2003 Underwood et al. ............ 1/1
7,158,943 B2 * 1/2007 van der Riet ................ 705/14
7,444,358 B2 * 10/2008 Paczkowski et al. ..... 707/104.1
2002/0087573 A1 * 7/2002 Reuning et al. ............. 707/102
2003/0154180 A1 * 8/2003 Case et al. .................... 707/1
2007/0073758 A1 * 3/2007 Perry et al. ................. 707/102
2007/0260521 A1 * 11/2007 Van Der Riet ............... 705/14

* cited by examiner

Primary Examiner—Kuen S Lu
Assistant Examiner—Binh V Ho
(74) Attorney, Agent, or Firm—Daniel McLoughlin; Hoffman Warnick LLC

(57) ABSTRACT

The present invention is directed to a method and system for managing context information in a web portal or enterprise portal comprising a hierarchical structure of portal pages and portlets for accessing web content or enterprise content accessible via the portal. A method for collecting context information based on user behavior and using the collected context information within the web portal environment, in accordance with an embodiment of the present invention includes: sensing context information during navigation of a user when the user is interacting with the portal elements; automatically storing, using a context producer component, context information in a context storage device accessible to the context producer component, wherein the context information is organized according to a queryable ontological context model managed by a context service component, which context model stores the context information according to semantic features; and automatically interacting with the context service component, using a context consumer component, wherein the context service component distributes specific context information to the context consumer component based on coincidence of semantic identity or similarity between a stored semantic feature and a semantic feature processable by the context consumer component.

6 Claims, 5 Drawing Sheets

PRIOR ART
PORTAL SERVER

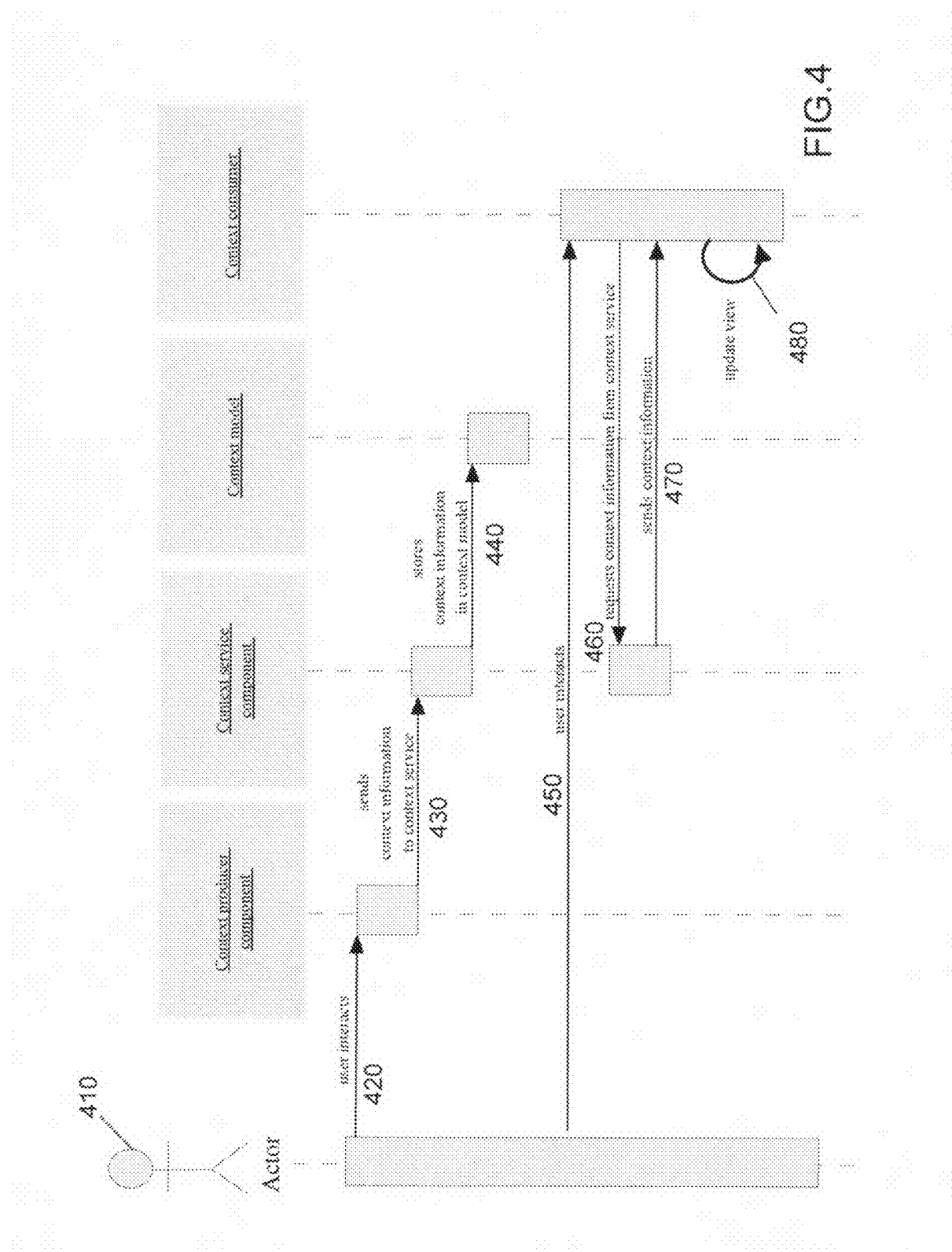

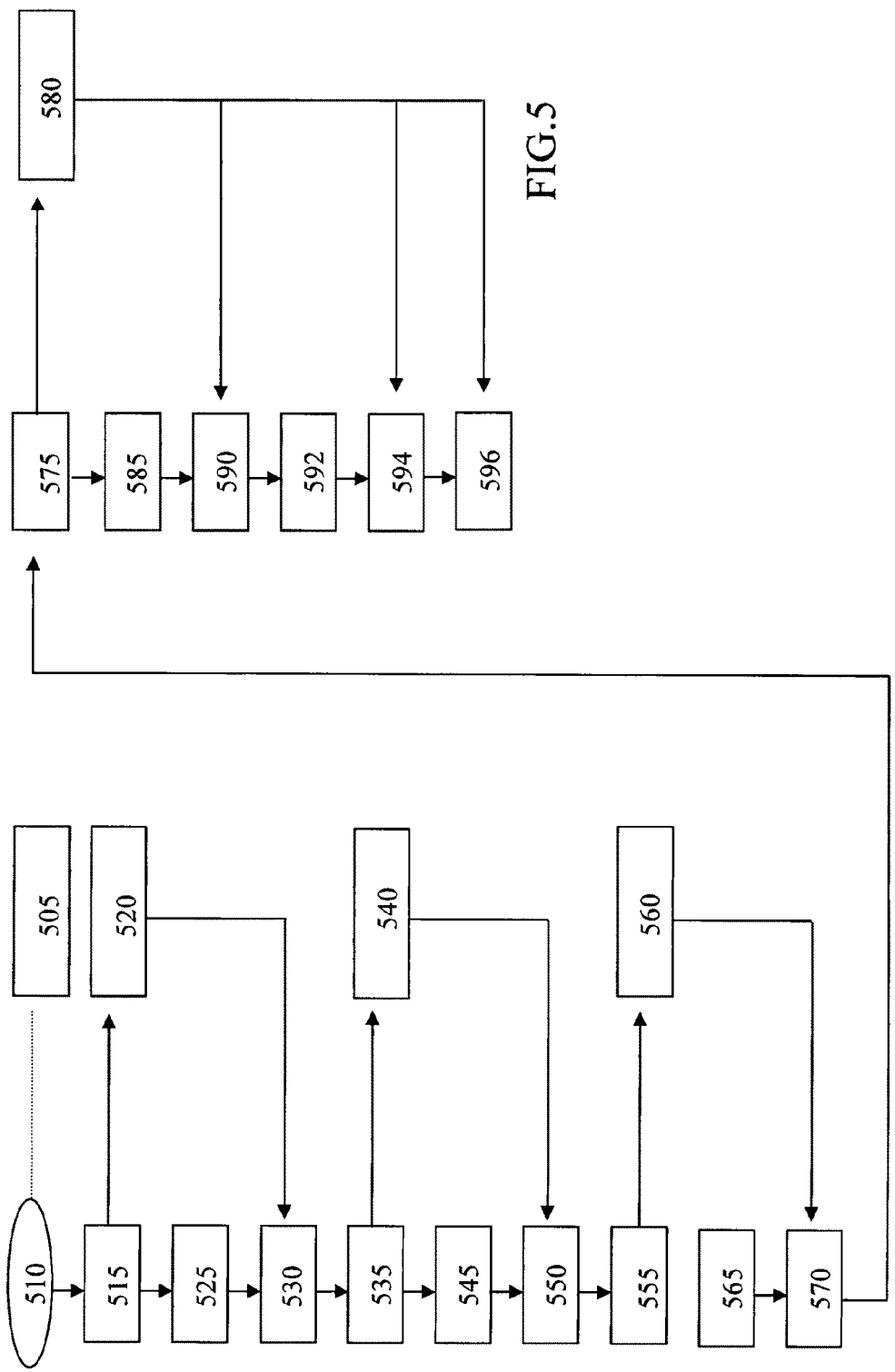

IMPLICIT CONTEXT COLLECTION AND PROCESSING

BACKGROUND OF THE INVENTION

1. Field of the Invention

The present invention relates to the field of network computing, and in particular to a method and system for managing context information in a web portal or enterprise portal comprising a hierarchical structure of portal pages and portlets for accessing web content or enterprise content accessible via the portal.

2. Related Art

FIG. 1 is a schematic system view of a portal server implementing a prior art web portal. The portal is implemented on a network server, for example, a web server 100. The web server 100 includes logic components for user authentication 105, state handling 110, and aggregation 170 of fragments. The web server 100 further includes a plurality of portlets 120, provided in respective pages 125, with a respective plurality of APIs 130 and respective portlet container software 135 for setting the pages 125 into a common Web page context, and some portal storage resources 140. The logic components are operatively connected such that data can be exchanged between single components as required.

A portal engine of the web server 100 in FIG. 1 implements an aggregation of portlets 120 based on an underlying portal model 150 and portal information such as security settings, user roles, customization settings, and device capabilities. Within a rendered page 125, the portal automatically generates the appropriate set of navigation elements based on the portal model 150. The portal engine invokes portlets 120 during the aggregation as required and when required and uses caching to reduce the number of requests made to the portlets 120.

A portlet container 135 is a single control component competent for all portlets 120, which may control the execution of code residing in each of these portlets 120. The portlet container 135 provides the runtime environment for the portlets 120 and facilities for event handling, inter-portlet messaging, and access to portlet instance and configuration data, among others. The portal resources 140 are in particular the portlets 120 themselves and the pages 125, on which they are aggregated in form of an aggregation of fragments. A portal database 128 stores the portlet description, which includes attributes such as the portlet name, portlet description, portlet title, portlet short title, and keywords. The portlet interaction interface description, which is often stored in form of WSDL (Web Services Description Language) documents, can also be stored in the portal database 128. The portal database 128 also stores the portal content structure, i.e. the hierarchical structure of portal pages, which may again contain nested pages, and portlets. This data is stored in the portal database 128 in an adequate representation based on prior art techniques such as relational tables.

The aggregation logic 170 includes all steps that are required to assemble a page 125. Typically, these steps include loading content structure from storage, traversing the content structure, and calling the instances referenced in the structure in order to obtain their output, which is assembled to a single page 125. The content structure may be defined through, e.g., portlet customization by an administrator or user and saved in the database, or by other ways, e.g., scripting, XML import, etc.

The handling of content information used by a user when navigating a portal is not yet sufficient. When a user navigates through a typical user application, as for example a word processor or a desktop publishing program, the user may copy some context information, for example, a sentence or some graphical depiction into a clipboard-like memory, which is generally known as a "clipboard" in known operating systems. Such information can also be used by a further program application or at a different location in the same program application, which generated it. The handling of context information in the prior art allows a manual copy and a manually performed paste.

The handling of context information in web applications is of increased importance because the Internet provides a very broad variety of services from nearly all fields of interest. Also, due to the fact that time-dependant information such as news is provided via the Internet, the handling of context information should be improved in order to adapt to the basic user need to collect information associated with the user's own personal interests in a quick and easy way.

In the prior art, so-called "collaborative filtering techniques" are used for determination of context information. These techniques analyze the navigational behavior of a group of users by prior art data mining techniques. Context information is determined and created by analyzing the navigational behavior of a user group the members of which comply to a predetermined user profile.

A disadvantage is that prior art techniques are not yet user-specific enough in order to properly cover user-specific interests. In view of the tremendous importance of the Internet as a globally available data source the handling of such context information should be improved.

There is a need, therefore, for a method and system offering improved web portal navigation.

SUMMARY OF THE INVENTION

The present invention is directed to a method and system for managing context information in a web portal or enterprise portal comprising a hierarchical structure of portal pages and portlets for accessing web content or enterprise content accessible via the portal.

According to a first aspect of the present invention, there is provided a method in a web portal environment comprising portal pages and portlets as portal elements, for collecting context information based on user behavior and using the collected context information within the web portal environment, comprising: sensing context information during navigation of a user when the user is interacting with the portal elements; automatically storing, using a context producer component, context information in a context storage device accessible to the context producer component, wherein the context information is organized according to a queryable ontological context model managed by a context service component, which context model stores the context information according to semantic features; and automatically interacting with the context service component, using a context consumer component, wherein the context service component distributes specific context information to the context consumer component based on coincidence of semantic identity or similarity between a stored semantic feature and a semantic feature processable by the context consumer component.

As such, relevant context information is automatically provided to the user when the user needs it for input into a portlet.

The method further comprises sensing semantic input information (e.g. an enterprise name, like IBM) input by the user during interaction of the user with a first portlet (e.g. a news portlet, a search engine, etc.); querying further semantic information (e.g., a user A is generally interested in shares of stock associated with the input information (IBM)) associated with the input information from the context model; and injecting the input information into a second portlet (e.g., a watch list of shares associated with the same user). In this way, a user's context information is "omni-present" for the user because the ontological model is automatically generated and grown in the course of time and user navigation, and an existing portlet code need not be changed.

The portal provider can offers preamble items, e.g., economics, sports, shares, life-style, geographical preferences, etc., of the ontological model. Then the model can easily be expanded.

BRIEF DESCRIPTION OF THE DRAWINGS

These and other features of this invention will be more readily understood from the following detailed description of the various aspects of the invention taken in conjunction with the accompanying drawings.

FIG. 4 is an interaction diagram illustrating the cooperation between the components depicted in FIG. 3, when a user navigates through a portal in accordance with an embodiment of the present invention.

FIG. 5 is a control flow diagram illustrating the growth of a context model during user navigation, in accordance with an embodiment of the present invention.

DETAILED DESCRIPTION OF THE INVENTION

Figure 1:
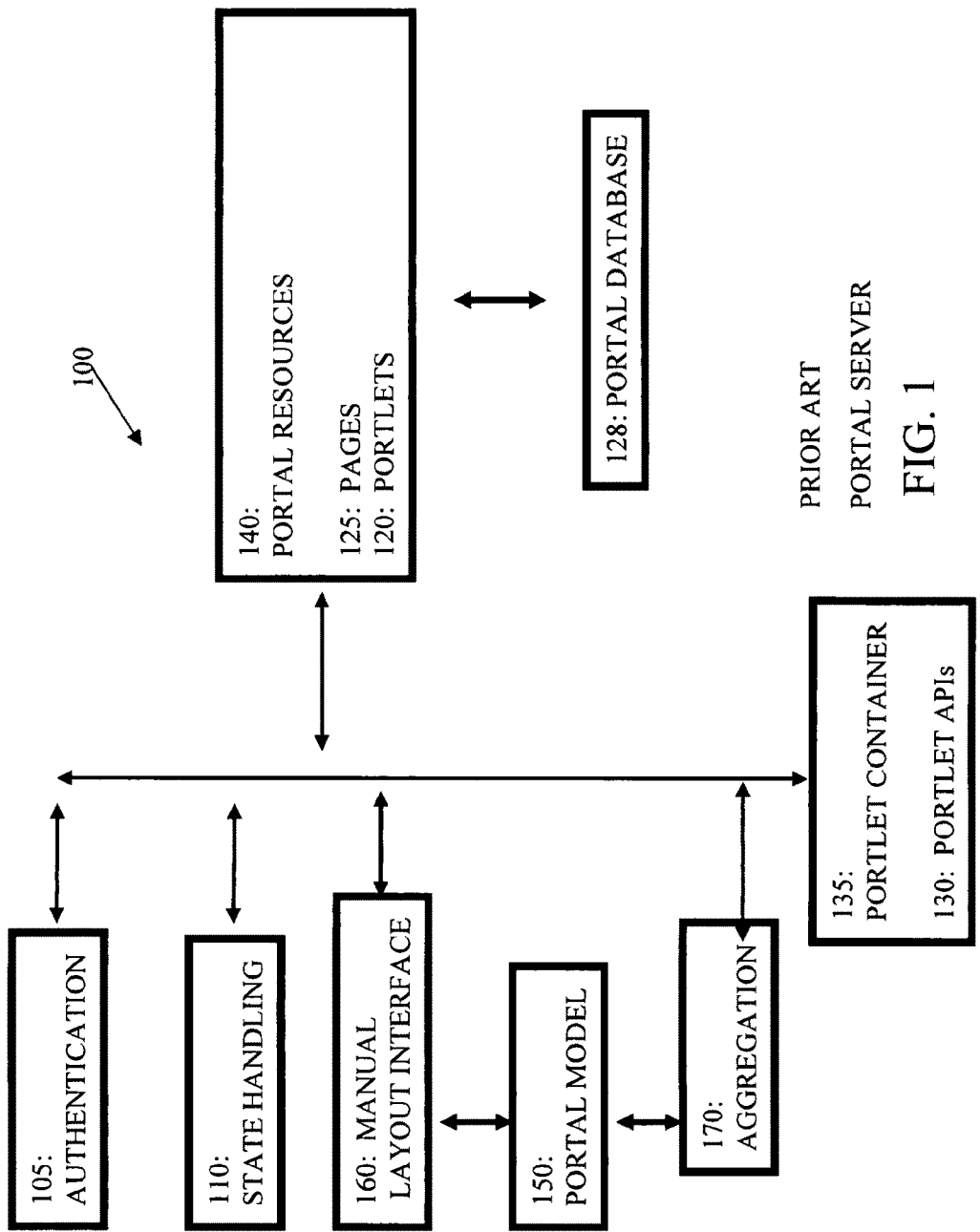
FIG. 1 is a schematic diagram illustrating the structural components of a prior art portal server including lines of interactions.
Figure 2:
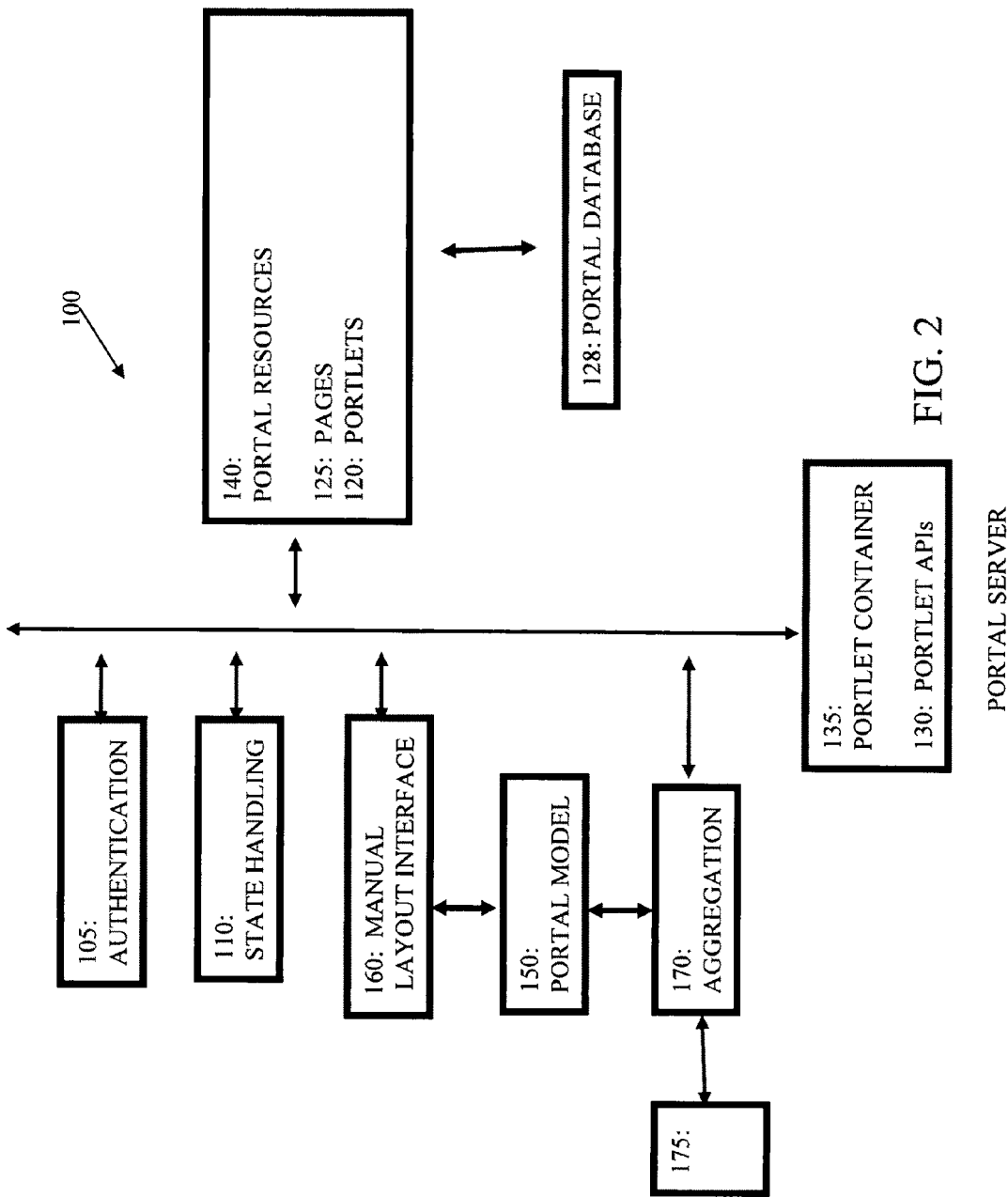
FIG. 2 is a schematic block diagram representation of a portal server according to an embodiment of the invention illustrating structural components implemented therein.

FIG. 2 is a schematic block diagram representation of a portal server 100 according to an embodiment of the invention illustrating structural components implemented therein. The portal server 100 includes the components depicted in FIG. 1, with the addition of a functional component 175 provided in accordance with an embodiment of the invention, which includes a bi-directional interface to an existing aggregation component 170. Details of the functional component 175 are illustrated and described with reference to FIG. 3 below.

Figure 3:
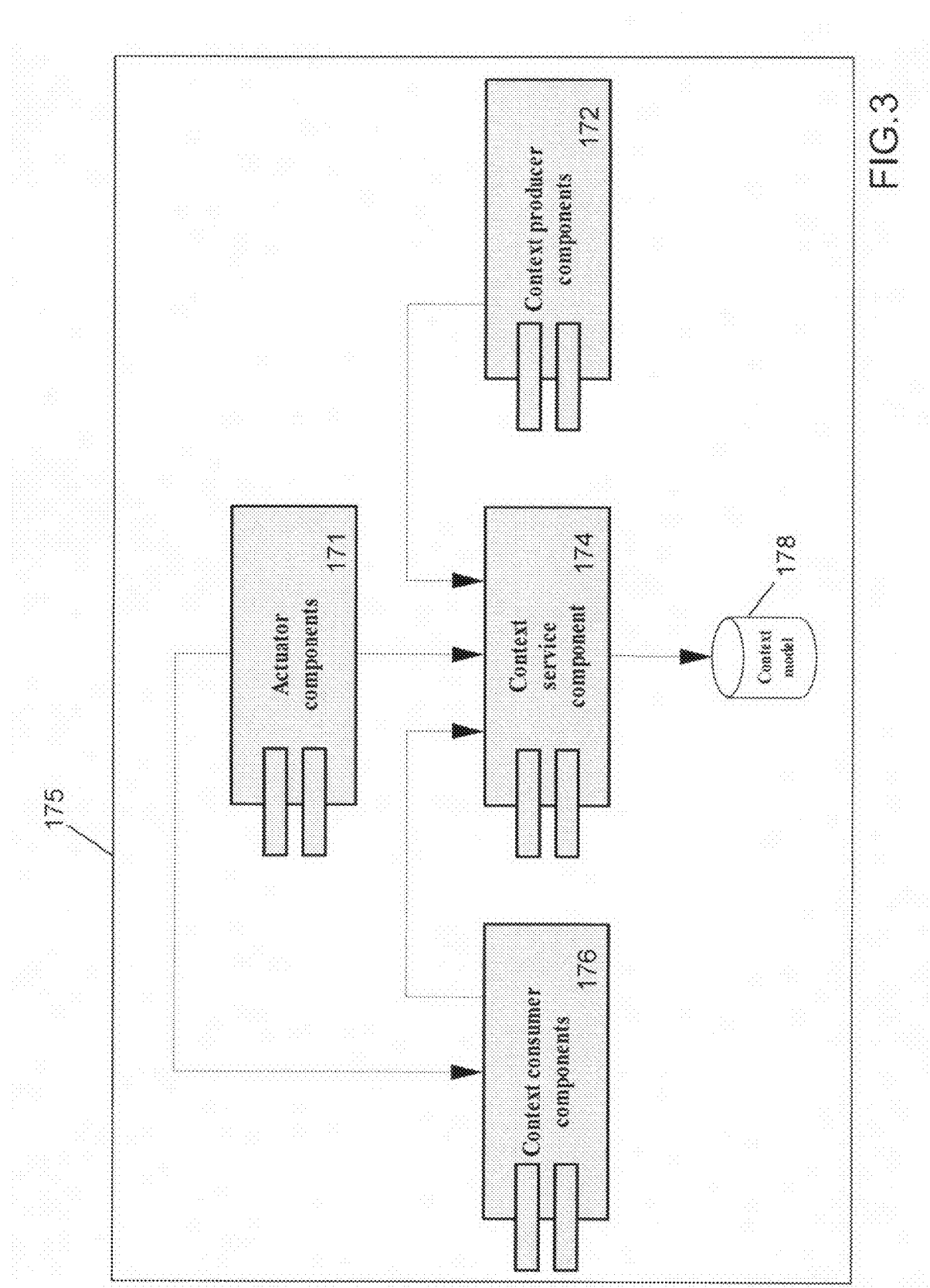
FIG. 3 is an enlarged view of the functional component 175 depicted in FIG. 2.

In FIG. 3, the functional component 175 includes a context service component 174, which implements a programmed interaction layer for the actuator components 171, context producer components 172, context consumer components 176, and context model 178, as well as a bi-directional interface in order to interact with a prior art aggregation component 170 (FIG. 2). More particularly, the context service component 174 implements a general read and write interface adapted for storing context information into the context model 178 residing in a respective database and to read context information therefrom. In an embodiment, read and write access is done via RDSQL queries, which resemble in syntax the usual SQL queries (select*from model where attribute=value). One task of the context service component 174 is basically to manage all context information, to interact with the rest of the components, and to generate, maintain and increase a context model 178 which is specific on a user level. Details on the context model 178 are provided below.

Context consumer components 176 are provided which invoke context service component 174 in order to obtain context information stored in the context model 178 which is of relevance. For example, a news portlet is in the sense of the present invention a context consumer component 176 because it may require context information as for example an enterprise name in which a user is interested, in order to display specific news associated with this enterprise. The portlet provider is required to provide so-called preamble items, which are to be understood as quite general themes or branches or technical fields or cultural themes, whichever is of interest for a given user in order to provide a basic structure of the database context model 178 maintained in the context database. In this embodiment an ontological model is used, in which information can be stored in a tree-like structure which can easily be queried for content information. One implementation is RDS and RDSQL.

Context producer components 172 are provided which use the context service component 174 in order to store context information within the context model 178 in a systematic way. The context producer components 172 may be implemented as portlets which store information automatically in response to what the user does during its personal navigation on the web portal. Context producer components 172 can also be any other sensor devices as for example a GPS transceiver connected to the system which generates the current geographical coordinates of the user. In particular, a context producer component 172 can store some information when a user has clicked on the same icon of a web page multiple times and invoke a respective same portlet for entering the same or similar context information. Similarity or identity is here of course to be seen in a semantic sense. For example a user may be assumed to be looking to buy a new car. In this case, brand names of cars are stored in the context model 178 as similar icons and the will be probably arranged in the context model 178 as sub nodes under the node "cars".

Context actuator components 171 are provided optionally in order to keep the context consumer components 176 unchanged without any reprogramming necessary. An actuator is a function which may read the content of the context model 178 and which may comprise a user interface for receiving any search criteria in order to read data from the context model 178, which complies with the search criteria. Thus, when in the context model 178 particular context attributes are available and possess values which correspond to such search criteria, they activate themselves and "inject" the code residing in the database under this criteria directly into any context consumer component 176 which needs them.

With reference to FIG. 4, there is illustrated a control flow diagram of a method in accordance with the present invention, when a content producer and a consumer interact via the context service without using the above mentioned actuators. In a first step 420 a user (actor) 410 interacts with any given context producer, here for example a news portlet. The user may be assumed to click for news about a given enterprise A. The context producer component 172 receives and processes the click action, extracts the enterprise name A from the request, and transmits this user behavior in form of the enterprise string "A", and, some information that this was a news portlet, to the context service component 174, see step 430. Context service component 174 stores this context information "news portlet", "enterprise A", into the before mentioned ontological context model 178 in database, see step 440.

At some later point in time the same user is assumed to interact with a context consumer component 176 (e.g., portlet), for example a shares portlet, see step 450. The context consumer component 176 automatically requests the context service component 174 for context information residing anywhere in the context model 178 which is identical or semantically related to the enterprise A. Identity can be easily checked by a respective text parser engine, where a similarity may be checked by invoking a respective similarity-detect function, step 460, which is to be prepared and implemented in a preoperative step.

In a step 470, the context service component 174 sends the context information back to the context consumer component 176. For example, if enterprise A has been found within the database, the context consumer component 176 (share portlet) may add the enterprise A into the watch list for shares for this particular user.

In a next step the context consumer component 176 displays this additional context information by providing respective HTML code. Thus, the portlet view is updated, step 480.

With further reference to FIG. 5, the control flow in an exemplary use case of the method in accordance with the present invention is illustrated. On the left side activities of the components 171, 172, 174 and 176 are shown, whereas on the right side the increasing (top to down) amount of datasets in the context model 178 is illustrated. Time increases from top to bottom of FIG. 5.

At the beginning, the context model 178 may be assumed to be empty. Then, in a step 510, a user may be assumed to visit a shop portlet, which takes the role as a context producer component 172, and the user may be assumed to click on some product A. Then, step 525, the shop portlet uses the context service component 174 to store information that this user is interested in product A. In the ontological model, for example, a sub-tree named "interested products" may be navigated to and a new sub-node is generated which is named "product A". Alternatively, if available, additional information can be stored telling the context model 178 what type of product is concerned. If product A is a particular model of a car, then this preamble item could be "interested cars", see box 520. Thus, a first entry has been created in the context model 178. Then, in step 525, the user decides to make a final price check and visits a price comparison portlet, which can be seen as a context consumer component 176. This price comparison component 176 then uses the context service component 174 in a step 530 in order to check for what the user is interested in. Thus, the context service component 174 is required to check the context model 178 to read the interested products and in particular to read the interested cars.

Thus, in a step 535, the price comparison portlet is informed by the context service component 174 that the user is interested in product A and issues the price comparison search automatically without any user action being required. The price comparison portlet now acts as a context producer component 172 and stores that information (e.g., the shop A which provides product A at the best price) in the context model 178 using the context service.

Then, in a step 545, the user decides to check for test results for product A before buying it and visits a test search portlet, which is again in this context a context consumer component 176. In step 550, this search portlet uses the context service component 174 again in order to check for what the user is interested in. Thus, in step 555 the context service component 174, after having read the context model 178 from the database, informs the search portlet that the user is interested in product A and issues the test search automatically, step 555. The test result may be assumed to reveal 4 out of 5 test points for this product. The search portlet acts as a context producer component 172 and stores this information (the good test result) in the context model 178, again using the context service component 174.

Then, the user may be assumed to remember that some of his colleagues discussed this product recently. As such, the user visits his mail portlet in a step 565 in order to see who discussed that with him and what has been the (context consumer). Thus, the mail portlet uses the context service component 174 in a step 570 in order to check the context model 178 for relevant information (e.g., emails).

Then, in a step 575, the mail portlet is informed by the context service component 174 that the user is interested in product A and searches all information (e.g., emails) within which this topic was discussed. In this embodiment, the names of the relevant mail contact persons are saved via the context service component 174, and the content of the relevant mails is also saved. In the context model 178, the relevant mail contacts, say persons A, B, C, are stored under this specific ontological item within its tree-structure. So, as visible in box 580, the context model 178 comprises for this specific node for this user:

That he is interested in product A, that his favorite shop is certain shop A, that the product he is interested in, which is product A, has been rated at 4 of 5 points, and that important personal contacts are the persons A, B, C.

Then, the user decides to use an instant messenger program in a step 585 in order to talk back to the before mentioned persons A, B, C again. Thus, he visits his instant messenger portlet which is thus assumed here to be a context consumer component 176. Again the instant messenger portlet uses the context service component 174 in order to check for contacts to display, see step 590. In this case, in a step 592, the instant messenger portlet is assumed to additionally display the contacts A, B, C. The user is enabled now to discuss the topic again, make his decision after the instant messenger discussions have been completed, and goes back to the shop portlet. The shop portlet then directly connects to shop A due to the information stored in the context model 178, see step 594, as shop A had the best price for this product A. It should be noted that this direct link to shop A is done due to the fact that the favorite shop has been already stored in the context model 178. Finally, see step 596, the shop portlet can be assumed to inform the user that the product is sold out, but that a product B is available, which had four points in the same test as used before, too. Thus, the user can be assumed to perform an online transaction in order to buy the product B.

As the skilled reader may appreciate from the foregoing description of the method as illustrated in FIG. 5, the context model 178 is filled with information over the course of time. The amount of information collected increases over time and will be overwritten by new information, if either the storage space limit has been reached, or will be overwritten at least in those parts which were collected to early in time, such that this early information has been marked with a respective timeout flag, which is used as a control bit that the respective information can be overwritten.

The skilled reader will appreciate that the before-mentioned embodiments showing certain procedures and proposed sequences of steps are primarily given for demonstrating a method in accordance with the present invention by way of example. Thus, it will be understood that those examples may be varied in various aspects, such as, for example, the ordering of steps, the degree of parallelization between steps, the implementation details of the single steps, the form in which data is stored, the way the grouping of portlets is achieved, etc., and respective further embodiments can be obtained.

The present invention can be realized in hardware, software, or a combination of hardware and software. A portlet arrangement tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following: conversion to another language, code or notation; and reproduction in a different material form.

The invention claimed is:

1. A method in a web portal environment comprising portal pages and portlets as portal elements, for collecting context information based on user behavior and using the collected context information within the web portal environment, comprising:
   automatically sensing context information during navigation of a user when the user is interacting with the portal elements;
   automatically storing, using a context producer component, the context information in a context storage device accessible to the context producer component, wherein the context information is organized according to a queryable ontological context model managed by a context service component, which context model stores the context information according to semantic features; and
   automatically interacting with the context service component, using a context consumer component, wherein the context service component distributes specific context information to the context consumer component based on coincidence of semantic identity or similarity between a stored semantic feature and a semantic feature processable by the context consumer component.

2. The method according to claim 1, further comprising:
   sensing semantic input information input by the user during interaction of the user with a first portlet;
   querying further semantic information associated with the input information from the context model; and
   injecting the input information into a second portlet.

3. The method according to claim 1, further comprising:
   offering, by a portal provider, preamble items of the ontological context model.

4. A portal server computer system implemented in a web portal environment comprising portal pages and portlets as portal elements, for collecting context information based on user behavior and using the collected context information within the web portal environment, comprising:
   a component for automatically sensing context information during the navigation of a user when the user is interacting with the portal elements;
   a context producer component for automatically storing the context information in a context storage device accessible to the context producer component, wherein the context information is organized according to a queryable ontological context model managed by a context service component, which context model stores the context information according to semantic features; and
   a context consumer component for automatically interacting with the context service component, wherein the context service component distributes specific context information to the context consumer component based on coincidence of semantic identity or similarity between a stored semantic feature and a semantic feature processable by the context consumer component.

5. The portal server computer system according to claim 4, further comprising:
   a component for sensing semantic input information input by the user during interaction of the user with a first portlet;
   a component for querying further semantic information associated with the input information from the context model; and
   a component for injecting the input information into a second portlet.

6. The portal server computer system according to claim 4, further comprising:
   a portal provider for offering preamble items of the ontological context model.

* * * * *